United States Patent [19]

Panster

[11] Patent Number: 4,595,740
[45] Date of Patent: Jun. 17, 1986

[54] POLYMERIC MONO-, DI-,TRI- AND TETRA-SULFIDE COMPOUNDS, PROCESS FOR PRODUCTION AND USE THEREOF

[75] Inventor: Peter Panster, Rodenbach, Fed. Rep. of Germany

[73] Assignee: Degussa Aktiengesellschaft, Frankfurt, Fed. Rep. of Germany

[21] Appl. No.: 513,193

[22] Filed: Jul. 13, 1983

[30] Foreign Application Priority Data

Jul. 13, 1982 [DE] Fed. Rep. of Germany ....... 3226091

[51] Int. Cl.$^4$ ............................................. C08G 77/22
[52] U.S. Cl. ..................................... 528/30; 556/427; 210/681
[58] Field of Search ........................... 556/427; 528/30

[56] References Cited

U.S. PATENT DOCUMENTS 3,873,489 3/1975 Thurn et al. ......................... 556/427
4,044,037 8/1977 Mui et al. ............................. 556/427

*Primary Examiner*—Melvyn I. Marquis
*Attorney, Agent, or Firm*—Beveridge, DeGrandi & Weilacher

[57] ABSTRACT

Polymeric mono-, di-, tri- and tetra-sulfides are described having an organopolysiloxane base structure of the units:

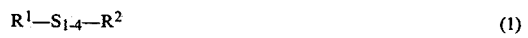

$$R^1-S_{1-4}-R^2 \qquad (1)$$

wherein $R^1$ and $R^2$ may be the same or different and represent a group of the formula:

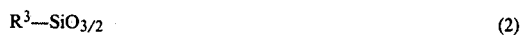

$$R^3-SiO_{3/2} \qquad (2)$$

and which base structure may further optionally contain the heteroatoms titanium or aluminum,
wherein $R^3$ is an alkylene group and the free valencies of the oxygen atoms are saturated by silicon atoms of additional groups of formula (2), optionally with the insertion of cross-linking silicon-, titanium- or aluminum compounds,
whereby the ratio of the silicon atoms in formula (2) to the silicon-, titanium- and aluminum atoms of any cross-linking agent may range from 1:0 to 1:10. In addition, processes for obtaining the sulfides and the use of these sulfides for the removal of certain ions from solutions are described.

31 Claims, No Drawings

POLYMERIC MONO-, DI-, TRI- AND TETRA-SULFIDE COMPOUNDS, PROCESS FOR PRODUCTION AND USE THEREOF

The invention relates to new polymeric sulfide compounds with an organopolysiloxane-base structure, optionally containing the heteroatoms titanium, aluminum, which are suitable as electron or sulfur donors for the fixing of Lewis acids or transition metal compounds. All these new polymeric compounds because of their organopolysiloxane matrix have a series of advantages as compared to corresponding polymeric sulfide systems derived from an organic base or as compared to carrier fixed sulfide systems. In addition, processes for the production of and use of these new products are described herein.

In chemical synthesis and operations, reagents and active substances combined with insoluble carrier systems have been used more frequently in recent times because a heterogenous method of operation offers, in part, considerable advantages, for example, in relation to separability, recylability and recoverability of the reagent or active substances. Beyond that, stability and useful life of an agent modified according to this principle are often clearly improved, or its characteristics are influenced to a desired degree. For some time in the past, those functional polymers have been used which above all serve in the form of ion exchangers or adsorbers for the selective removal of ions or ionic or neutral compounds from liquid or gaseous phases. Several authors have previously reported on the state of the prior art in the field of synthesis and use of functionalized polymer systems, such as for example, D. C. Neckers in CHEMTECH, February 1978, page 108; A. Patchornik and M. A. Kraus in Pure and Appl. Chem. 43, 503 (1975); C. U. Pittmann, Jr. in Polymer News 5, 30 (1978); D. D. Whitehurst in CHEMTECH, January 1980, page 44 or F. Martinola in Chem. Eng. Tech. 51, 728 (1979).

As carrier materials according to the above mentioned state of the art, hitherto particularly polymer systems of an organic nature were used. These fulfill in some cases very sufficiently the necessary requirements with regard to thermal and chemical stability, inertness against chemical attacks, acccessibility of the functional groups and insolubility in the solvents employed. Frequently, however, difficulties also occurred because of the fact that the organic matrix backbone not having a fixed structure, has only a limited temperature stability, will be broken down relatively quickly chemically or bacteriologically, will swell considerably in the solvent used, can be dissolved, adhered together or is accessible only with difficultly as regards the functional groups. As compared to that, inorganic polymers such as, for example, silica acid or silica gel, aluminum oxide or titanium dioxide are better suited, in principle, for such purposes because they have a fixed, rigid structure, are non-swellable, have high temperature and aging resistance, insolubility and possess relatively easy accessibility of the functional groups present, since these are generally situated on the outside and inside surface. Beyond that, inorganic polymers from the standpoint of the raw material still possess the advantage of an almost unlimited availability which in view of the continuously shrinking petroleum and coal supplies, certainly does not apply to corresponding organic systems. Nevertheless, the latter were heretofore overwhelmingly used for the fixation of active substances for the reason that inorganic polymer systems have only limited load carrying capacity and frequently do not possess particularly stable binding to the active substance.

Therefore, it is the goal of the present invention to provide new functional polymer systems with an organopolysiloxane base structure, which optionally may contain heteroatoms such as titanium or aluminum, in the form of mono-, di-, tri- and tetrasulfide compounds which have the initial advantages of systems fixed to silica but which do not possess their disadvantages, and for beyond that having a considerably higher active substance/matrix weight ratio; the matrix anchoring of the functional unit takes place by way of several very stable Si—C-bonds and not by way of primarily an Si—O—Si bond which is labile only with regard to certain reagents.

In further detail, these new polymeric sulfide compounds are characterized by the fact that they are composed of units of the formula (1):

$$R^1-S_{1-4}-R^2 \qquad (1)$$

wherein $R^1$ and $R^2$ represent a group of the formula (2)

$$R^3-SiO_{3/2} \qquad (2)$$

wherein $R^3$ represents linear or branched alkylene with 1 to 12 C atoms, cycloalkylene with 5 to 8 C atoms,

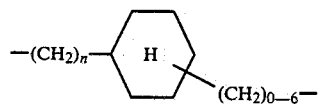

or

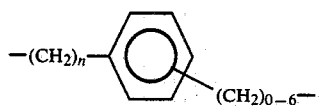

wherein n is an integer from 1 to 6 and represents the number of methylene groups bound to sulfur, $R^1$ and $R^2$ may be the same or different and the free valencies of the oxygen atoms are saturated either by silicon atoms of the additional groups represented by the formula (2) and/or by cross-linking bridge members of the formula:

$$SiO_{4/2}$$

or $$R'SiO_{3/2}$$

or $$R_2'SiO_{2/2}$$

or $$TiO_{4/2}$$

or $$R'TiO_{3/2}$$

or $R_2'TiO_{2/2}$ or $AlO_{3/2}$ or $R'AlO_{2/2}$ wherein R' is methyl or ethyl and the ratio between the silicon atoms in the formula (2) in relation to the bridging atoms silicon, titanium and aluminum, ranges from 1:0 to 1:10.

This ratio is governed by the desired porosity as well as by the fact of whether or not a more water wettable or water repellent polymer is to be produced. Furthermore, by way of this ratio it is possible to regulate the specific surface, the bulk weight and especially the sulfide content and the sulfide density in the polymer.

In the event of an increase of the cross-linking agent content, the sulfide density, sulfide content and the hydrophobic character decrease; porosity, specific surface and bulk weight increase. By including cocondensable, hetero element compounds, such as aluminum alcoholates or titanium esters, it is possible to modify the polymer further.

Typical examples for the mono-, di-, tri- and tetrasulfide compounds according to the invention are polymers consisting of units represented by the following formulas:

$S(CH_2SiO_{3/2})_2$, $S_4(CH_2SiO_{3/2})_2$, $S[(CH_2)_3SiO_{3/2}]_2$, $S[(CH_2)_{12}SiO_{3/2}]_2$, $$S_2(CH_2-\overset{CH_3}{\underset{|}{CH}}-CH_2SiO_{3/2})_2,$$

$S_4[(CH_2)_3SiO_{3/2}]_2$,

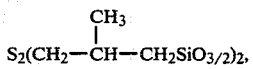

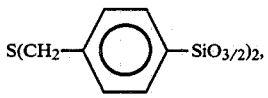

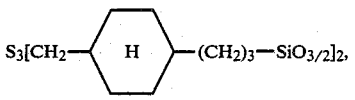

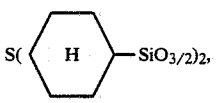

$S[(CH_2)_3SiO_{3/2}][(CH_2)_5SiO_{3/2}]$,
$S[(CH_2)_3SiO_{3/2}\cdot 3SiO_2$,
$S[(CH_2)_5SiO_{3/2}]_2\cdot Al_2O_3$ From the point of view of easier accessibility, of the very good thermal stability and the inertness against chemical attacks, especially against alkaline bases, the polymeric sulfides according to formula (1) wherein $R^1$ and $R^2$ are identical are preferred. With regard to the availability of the starting materials, among these compounds particular importance is assigned to the members having the units of the formula:

$S_{1-4}(CH_2CH_2CH_2SiO_{3/2})_2$

A further aspect of the present invention resides in polymeric di-, tri- and tetrasulfides of the formula:

$R^1-S_{2-4}-R^2$ wherein $R^1$ and $R^2$ are defined as hereinabove.

in a still further aspect, the present invention resides in polymeric tri- and tetra sulfides of the formula:

$R^1-S_{2-4}-R^2$ wherein $R^1$ and $R^2$ are defined as hereinabove.

Another object of the invention is to provide a process for the production of the polymeric mono-, di-, tri- and tetrasulfides. The process begins with the corresponding monomer compounds of the formula:

$R^4-S_{1-4}-R^5$ (3)

wherein $R^4$ and $R^5$ represent a group of the formula:

$R^3-Si(OAlk)_3$ (4)

in which $R^3$ represents a linear or a branched alkylene with 1 to 12 C atoms, cycloalkylene with 5 to 8 C atoms or a unit of the formula:

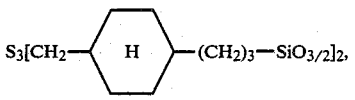

or

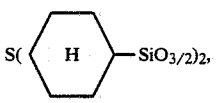

wherein n is an integer from 1 to 6 and represents the number of methylene groups bound to sulfur, $R^4$ and $R^5$ may be the same or different, Alk is a linear or a branched alkyl group with 1 to 5 C atoms, which are converted by a hydrolysis and condensation reaction in the presence of sufficient water. Optionally, there may also be added a solution agent and/or a cross-linking agent of the formula:

$Me(OAlk)_{2-4}R'_{0-2}$ (5)

$Al(OAlk)_{2-3}R^1{}_{0-1}$ (6)

wherein Me=Si or Ti, Alk has the same meaning mentioned above with regard to the formula (4), and R' is a methyl or ethyl group. The quantity of water employed is at least the amount required for a complete hydrolysis and condensation, preferred however is an excess quantity of water, at ambient temperature up to 200° C., at a normal pressure or an excess pressure which corresponds to the sum of the partial pressures in the case of the pertinent temperature. The solid substance, optionally exposed immediately after its formation, to a treatment at reflux temperature, will be separated subsequently from the liquid phase, may be dried, optionally tempered and optionally ground and/or classified. The sequence of these process steps may vary or several of these steps may be carried out in parallel side by side.

The monomer compounds according to formula (3) are to the greatest extent previously known compounds which can be synthesized according to conventional processes, as for example in the German Nos. AS 21 41 159, 21 41 160, 27 12 866, 24 05 758, in the German Pat. No. 25 42 534 or as described by M. Schmidt and M. Wieber in Inorg. Chem. 1, 909 (1962). As typical representatives of monomeric mono-, di-, tri- and tetra-sulfide compounds or monomer mixtures from which the preceding polymer members illustrated by way of example, may be obtained, there can be mentioned:

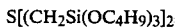

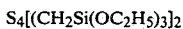

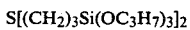

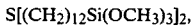

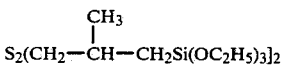

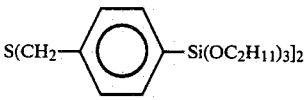

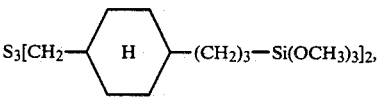

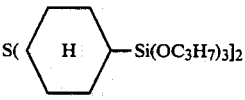

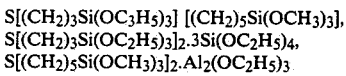

S[(CH$_2$)$_3$Si(OC$_3$H$_5$)$_3$] [(CH$_2$)$_5$Si(OCH$_5$)$_3$],
S[(CH$_2$)$_3$Si(OC$_2$H$_5$)$_3$]$_2$.3Si(OC$_2$H$_5$)$_4$,
S[(CH$_2$)$_5$Si(OCH$_3$)$_3$]$_2$.Al$_2$(OC$_2$H$_5$)$_3$

Instead of the alkoxy silyl derivatives used as starting compounds, it is naturally also possible to use corresponding chloro-, bromo- iodo- or phenoxysilyl members, however, their use offers no advantages on the one hand because of the violent and difficultly controlable hydrolysis as well in the case of the halogen derivatives the halogenides adhering strongly to the polymer products and because on the other hand of the difficult accessibility of the phenoxy systems.

The selection of the solvent optionally used during the hydrolysis is in principle not critical, however, solvents with a polar nature have proven themselves to be particularly suitable such as cyclic or open-chain ethers, chlorohydrocarbon compounds, aliphatic or aromatic nitrocompounds, aliphatic or aromatic nitriles or dimethyl formamide, dimethyl sulfoxide, acetone, diethyl ketone, methyl ethyl ketone and especially lower alcohols such as methanol, ethanol, n- and i-propanol, n-, i- and t-butanol or n-pentanol or mixtures thereof.

In the case where the preferred lower alcohols are used, as a practical matter, a lower alcohol will be selected having the same alkoxy group as the alkoxy groups present on the silicon atoms of the monomeric sulfide or on the Si-, Ti- and Al-atoms of the cross-linking agents. The same criteria apply also in the case of the incorporation of cross-linking agents for the selection of the monomeric sulfide/cross-linking precursor system.

The hydrolysis and the polycondensation of the monomeric material or of the mixture of monomeric materials may be carried out in principle at ambient temperature, however, in order to obtain a rapid course of these reactions, an elevated temperature of below 200° C. is preferred. At the same time, superatomspheric pressure is not necessary, but may be used. The pressure in that case corresponds to the sum of the partial pressures of the components of the reaction mixture at the reaction temperature used. For the purpose of increasing the dispersability and stability of the gel like polymer products precipitated from the solution after completion of the polycondensation reaction, the gel like polymer product in suspension may be exposed directly to a heat treatment of about 1 hour up to several hours which treatment is carried out preferably at reflux temperature of the present solvent mixture, whereby at the same time, an intensive thorough mixing is carried out, optionally in combination with a wet grinding. Since the polycondensation of the monomeric material evolves particularly well whenever the starting solution is concentrated as much as possible, the addition of more solvent and/or water to the voluminous product suspension as a rule turns out to be advantageous for a good dispersion and heat treatment.

A variation of the polycondensation method according to the invention described above is represented by a process according to which the monomeric sulfide of the formulae (3) and (4) or in solution in one of the previously mentioned solvents, optionally together with a cross-linking agent according to formulae (5) or (6) at ambient temperature or elevated temperature under vigorous stirring is introduced into water or a water/solvent mixture and the solid substance formed, optionally after a further heat treatment in suspension, is separated from the liquid phase, is dried, optionally tempered, optionally ground and/or classified, wherein the sequence of these process steps may be partially varied or several of these process steps may be carried out in parallel side by side.

In the sense of a rapid polycondensation, it will occasionally be advantageous to add to the hydrolysis mixture one of the common polycondensation catalysts, in the simplest case for example, small quantities of a diluted, aqueous HCl solution.

The separation of the polymeric sulfide formed from the aqueous phase may be accomplished according to conventional techniques such as filtering, centrifuging and/or decanting. As an alternative thereto, it is possible to isolate the solid substance also by evaporation of the volatile components of the product suspension at elevated temperatue, optionally while applying a vacuum. In order to remove any organic or inorganic impurities adhering to the solid substance, in every case a secondary washing or extraction of the isolated products with the used solvents and/or with desalinated water is useful. Subsequently, this may be dried at temperatures of ambient temperature to 250° C. optionally with the use of a vacuum and may be ground, if desired, and/or classified.

In order to increase the stability of the matrix, it is often desirable to carry out a tempering of the product. This may be accomplished during or after the drying in the form of a temperature treatment of the polymeric solid substance over a period of time of at least one hour up to four days at 150°–400° C. and optionally with the use of a vacuum.

From the standpoint of physical characteristics, the new polymeric mono-, di-, tri-, and tetra-sulfide compounds behave like special silicic acids or silica gels insoluble in water and organic solvents and depending on the pretreatment they have specific surfaces of 0.01 to 3000 m$^2$/g and particle size diameters of about 1 cm to about 1 µm. They are partially thermally stable in air up to a temperature of 350° C. maximum and under a protective gas atmosphere are stable up to a temperature of about 400° C., whereby generally with increasing sulfur content, a decreasing stability is to be noted. Their stoichiometric composition may be proven relatively precisely on the basis of elementary analysis. The new polymeric compounds of the invention are solids which are insoluble in organic and inorganic solvents.

The potential applications of the polymeric sulfide compounds prepared according to the invention are of a variable and diverse nature and cannot be summarized under any single generalization. In general however, it is possible to differentiate between the direct use of the product and an indirect use which is enabled only after an additional chemical modification so that these new polymers may also be considered as intermediate products.

In particular, there may be mentioned the use of the polymeric monosulfide compounds for the production of so-called heterogenized complex catalysts, wherein the sulfide has the function of a carrier and the function of a polymeric complex ligand at the same time. This utilization was previously carried out in principle in the course of the production of polymeric rhodium-sulfide-complex compounds which were unknown up to that point and which exhibit particularly good catalytic characteristics for hydrogenations and hydroformulations (see German No. OS 28 34 691).

It is to be noted that the polymeric sulfides were, however, never isolated by themselves and characterized, as they were obtained either together with a rhodium component or were further processed directly in suspension, so that in any event, the presence of the herein described monosulfide species was not established. In the production of the mentioned rhodium sulfide complexes, it might however possibly turn out to be useful to start out from the isolated polymeric sulfide defined in this connection, for example, whenever it is necessary to operate free of water and alcohol.

It has been determined that the monosulfide as well as the di-, tri- and tetrasulfide derivatives are preeminently suited in order to remove certain metal compounds or metal ions from aqueous or organic solutions. In the case of the monosulfide, a donar-acceptor-mechanism operates, as a result of which in principle all metal ions and metal compounds, especially of transition metals, which enter into such reciprocal effects, may be removed from a solution, while in the case of the di-, tri- and tetrasulfides, one may proceed from the formation of difficultly soluble metal sulfides and/or mercaptides after the reaction of the metal ion with the sulfur bridge.

Thus, the tri- and tetrasulfides are particularly suitable for "trapping" metal ions present in the ppm area and which form difficultly soluble sulfides.

To the ions or compounds which enter into reciprocal effects with polymeric mono-, di-, tri- and tetrasulfides, there may be included especially those of the elements of the VI-VIII, I and II secondary group, of the periodic system as well as those of tin and lead.

The "trapping" of the metal compounds or metal ions by means of the new polymeric sulfides, especially of the monosulfide or tetrasulfide compounds, may be carried out taking into consideration the static or dynamic principle from the standpoint of the process. For this purpose, the polymeric sulfide compound is used either in an exchanger column or in suspension according to known techniques. While in the former case, a minimum particle size of about 0.1–0.2 mm should be chosen in order to secure a sufficient throughflow, the product in the other case should be chosen to be more finely divided.

The application will be further explained below in the light of the examples of the individual embodiments with due consideration of the basically important starting substances.

EXAMPLE 1

200.0 g (0.425 mole) S[CH$_2$Si(O—i—C$_3$H$_7$)$_3$]$_2$ were dissolved in 300 ml of isopropanol. Subsequently while stirring slowly and within 1 hour, a total of 200 ml of desalinated water were added to the clear solution heated to 70° C. Soon after the addition of 100 ml of water, the solution became strongly viscous and gelled spontaneously into a pudding-like, transparent mass. After the addition of another 200 ml of water, the mixture was heated to reflux temperature and while stirring vigorously was converted into an easily mobile suspension. It was stirred for a total of 2 hours under reflux, then the solid substance was filtered off by way of a suction strainer, was washed with 2 liters of desalinated water and was subsequently dried for 12 hours at 150°/100 mbar, was tempered at 250° C. for 24 hours and then ground in a ball mill. In the case of complete hydrolysis and condensation, an amount of 69.8 g was to be expected. It was thereby possible to obtain 73.0 g (104.6% of theory) of a finely powdered, insoluble whitish-yellow solid substance consisting of polymer units of the summary formula S[CH$_2$SiO$_{3/2}$]$_2$.

| Analysis Data: | % C | % H | % S | % Si |
|---|---|---|---|---|
| Theory: | 14.62 | 2.45 | 19.52 | 34.19 |
| Found: | 14.85 | 2.90 | 19.14 | 33.42 |

EXAMPLE 2

250 g (0.60 mole) S$_2$[(CH$_2$)$_3$Si(OCH$_3$)$_3$][(CH$_2$)$_5$Si(OCH$_3$)$_3$] were dissolved in 400 ml of acetone. The clear solution was then first mixed with 30 ml of desalinated water and with 1 ml of 1n HCl solution and was stirred under reflux for 1 hour. After that, it was cooled and the viscous solution was introduced into a mixture of 150 ml desalinated water and 50 ml of methanol while stirring slowly and within 30 minutes.

Subsequently, after the addition of another 100 ml of H$_2$O, it was heated to reflux temperature and the precipitate which developed was stirred for another 2 hours at this temperature. In the course of this secondary treatment, the solid substance was converted with the help of an Ultra-Turrax into a finely dispersed form, subsequently it was filtered off, was washed with 200 ml of methanol as well as 1 liter of water, was dried at 150° C. for 12 hours and subsequently was tempered for 48 hours at 200° C./80 mbar. 158.1 g (94.4% of theory) of a bright-yellow, powdery, polymeric solid substance consisting of polymer units of the formula $S_2[(CH_2)_3SiO_{3/2}]$ $[(CH_2)_5SiO_{3/2}]$ were obtained.

| Analysis Data: | % C | % H | % S | % Si |
|---|---|---|---|---|
| Theory: | 34.26 | 5.75 | 22.86 | 20.03 |
| Found: | 33.89 | 5.85 | 22.07 | 19.46 |

EXAMPLE 3

500 g (1.13 mole) $S[(CH_2)_3Si(OC_2H_5)_3]_2$ were dissolved in 750 ml of technical ethanol. After heating to 60°–70° C., the solution was mixed with 500 ml of desalinated water while stirring slowly. Even after the addition of the first 200 ml of water, the solution thickened and finally solidified into a solid mass. The latter, after the addition of 300 ml of $H_2O$, was converted into a mobile suspension which was stirred yet for another 1 hour at reflux. Then, this was filtered off and the remaining solid substance was washed with a total of 1 liter of $H_2O$, it was dried for 12 hours at 120° C./100 mbar and was tempered for 24 hours at 280° C./100 mbar. The bright-yellow, somewhat lumpy, solid substance was then subjected to course mechanical comminution in a ball mill and was classified into the grain size fractions of 0.2–0.6 mm, 0.05–0.2 mm as well as <0.05 mm.

A total of 224.7 g (90.3% of theory) was thereby obtained of the polymeric monosulfide consisting of units of the formula $S[(CH_2)_3SiO_{3/2}]_2$.

| Analysis Data: | % C | % H | % S | % Si |
|---|---|---|---|---|
| Theory: | 32.70 | 5.49 | 14.55 | 25.49 |
| Found: | 31.91 | 5.90 | 14.22 | 24.84 |

A DSC (differential calometry) examination of this polymeric sulfide under nitrogen resulted in an endothermal decomposition beginning at 342°, while in air, an exothermal decomposition began at 303° C. The determination of density established a value of 1.36 g/cm³.

EXAMPLE 4

Using 450 g (0.83 mole) $S_4[(CH_2CH_2CH_2Si(OC_2H_5)_3]_2$; 500 ml of acetonitrile and a total of 700 ml of $H_2O$ and operating analogously to Example 3, and after 12 hours of drying at 120° C./100 mbar as well as 12 hours of tempering at 180° C./100 mbar, there was obtained 255.9 g (96.8% of theory) of a polymeric solid substance consisting of units of the formula $S_4[(CH_2)_3SiO_{3/2}]_2$.

| Analysis Data: | % C | % H | % S | % Si |
|---|---|---|---|---|
| Theory: | 22.76 | 3.82 | 40.51 | 17.74 |
| Found: | 23.20 | 3.97 | 39.90 | 17.02 |

A DSC examination of the polymeric tetrasulfide under nitrogen resulted in an endothermal decomposition beginning at 215° C. and, in air resulted in an exothermal decomposition beginning at 279° C.

EXAMPLE 5

300 g (0.49 mole) of $S[(CH_2)_{12}Si(OCH_3)_3]_2$ were dissolved together with 74.7 g (0.49 mole) of $Si(OCH_3)_4$ in 300 ml of methanol. To the solution heated to 50° C., 300 ml of $H_2O$ were added in doses within 1 hour. The solid substance which was formed thereby and after the addition of an additional 200 ml of methanol was stirred for another 2 hours under reflux. Then, the solid substance was separated by centrifuging of the water/methanol mixture, was washed with 2×100 ml of methanol and was dried for 10 hours at 150° C. and subsequently was tempered for 24 hours at 200° C. In the case of a complete hydrolysis and co-polycondensation, 261.6 g of the polymeric cross-linked sulfide consisting of units of the formula $S[(CH_2)_{12}SiO_{3/2}]_2$. $SiO_2$ were to be expected. It was possible thereby to obtain 243.9 g (93.2% of theory).

| Analysis Data: | % C | % H | % S | % Si |
|---|---|---|---|---|
| Theory: | 54.09 | 9.08 | 6.01 | 15.81 |
| Found: | 53.78 | 10.56 | 6.51 | 14.09 |

EXAMPLE 6

Using 300 g (0.55 mole) of $S_3[(CH_2)_3Si(OCH_3)_3]$ $[(CH_2)_3Si(O—n—C_4H_9)_3]$ and 11.6 g (0.055 mole) $(H_5C_2)Ti(OC_2H_5)_3$ in 300 ml of n-butanol and operating analogously to Example 4, 147.15 g (91.4% of theory) of an organopolysiloxane were obtained consisting of units of the formula $S_3[(CH_2)_3SiO_{3/2}]_2$. $0.1(H_5C_2)TiO_{3/2}$.

| Analysis Data: | % C | % H | % S | % Si | % Ti |
|---|---|---|---|---|---|
| Theory: | 25.28 | 4.28 | 19.07 | 32.65 | 1.63 |
| Found: | 25.02 | 4.76 | 18.52 | 31.11 | 1.42 |

A measurement of density carried out on the product resulted in a value of 1.4 g/cm³.

EXAMPLE 7

Using 250 g (0.50 mole) of

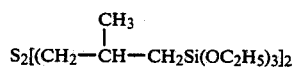

and 245.0 g (1.0 mole) of $Al(OC_4H_9)_3$ in 300 ml of ethanol and operating analogously to Example 4, there was obtained 190.7 g (100.3% of theory) of an organopolysiloxane consisting of units of the formula:

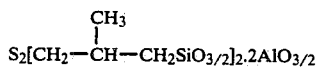

| Analysis Data: | % C | % H | % S | % Si | % Al |
|---|---|---|---|---|---|
| Theory: | 25.12 | 4.22 | 16.76 | 14.69 | 14.11 |
| Found: | 25.83 | 4.76 | 16.21 | 14.13 | 13.44 |

EXAMPLE 8

Using 498.9 g (1.0 mole) of $S[(CH_2)_5Si(OC_2H_5)_3]_2$, 148.3 g (1.0 mole) $(H_3C)_2Si(OC_2H_5)_2$ and a total of 600 ml (400+200 ml) H₂O, in 500 ml of ethanol and operating analogously to Example 4, there was obtained 327.9 g (93.5% of theory) of an organopolysiloxane consisting of units of the formula S[(CH₂)₅SiO₃/₂]₂.(H₃C)₂SiO₂/₂.

| Analysis Data: | % C | % H | % S | % Si |
|---|---|---|---|---|
| Theory: | 34.25 | 7.47 | 9.14 | 24.03 |
| Found: | 33.88 | 8.21 | 8.97 | 23.99 |

EXAMPLE 9

350 g (0.58 mole) of

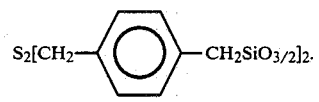

dissolved in 400 ml of ethanol, were heated to 60° C. While stirring slowly, the clear solution was mixed within 0.5 hours with 200 ml of desalinated water.

The gel-like, solid substance formed thereby was stirred vigorously after the addition of an additional 200 ml of water for yet another 2 hours at reflux temperature, was then cooled, filtered off and washed with 2 liters of desalinated water. After 8 hours of drying at 120° C./100 mbar and 55 hours of tempering at 200° C./100 mbar, it was possible thereby to obtain 215.7 g (98.0% of theory) of an organopolysiloxane, consisting of the formula

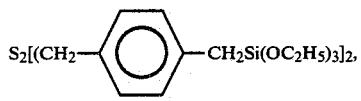

The coarse particle size, solid substance was comminuted subsequently in a hammer mill.

| Analysis Data: | % C | % H | % S | % Si |
|---|---|---|---|---|
| Theory: | 51.03 | 4.28 | 17.03 | 14.92 |
| Found: | 50.69 | 4.76 | 17.21 | 14.23 |

EXAMPLE 10

Using 200 g (0.33 mole) of

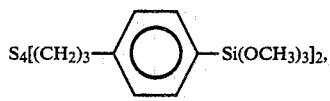

dissolved in 300 ml of methanol and a total of 300 ml of desalinated water and operating analogously to Example 9, after 10 hours of drying at 100° C./100 mbar and 48 hours of tempering at 150° C./100 mbar, there was obtained 153.5 g (99.4% of theory) of a polymeric tetrasulfide consisting of units of the formula

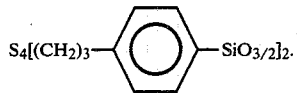

| Analysis Data: | % C | % H | % S | % Si |
|---|---|---|---|---|
| Theory: | 46.12 | 2.15 | 27.36 | 11.98 |
| Found: | 45.74 | 2.10 | 26.88 | 11.74 |

EXAMPLE 11

Using 270 g (0.59 mole) of

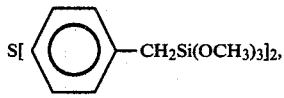

dissolved in 300 ml of methanol and a total of 350 ml of desalinated water, operating analogously to Example 9, after 8 hours of drying at 150° C. and 48 hours of tempering at 220° C., there was obtained 184.5 g (98.2% of theory) of an organopolysiloxane consisting of units of the summary formula

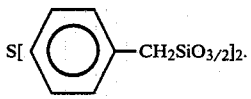

| Analysis Data: | % C | % H | % S | % Si |
|---|---|---|---|---|
| Theory: | 53.13 | 3.82 | 10.13 | 17.75 |
| Found: | 52.98 | 3.79 | 10.04 | 17.26 |

EXAMPLE 12

Using 410 g (0.78 mole) of

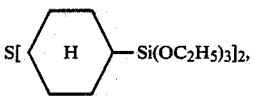

dissolved in 500 ml of ethanol and a total of 500 ml of desalinated water, operating analogously to Example 9, after 6 hours of drying at 150° C. and 60 hours of tempering at 200° C., there was obtained 229.5 g (97.4% of theory) of an organopolysiloxane consisting of units of the formula

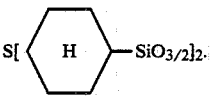

| Analysis Data: | % C | % H | % S | % Si |
|---|---|---|---|---|
| Theory: | 47.97 | 6.71 | 10.67 | 18.69 |
| Found: | 47.50 | 6.82 | 10.29 | 18.34 |

EXAMPLE 13

350 ml of a solution of a homogenous hydrogenation product consisting of approximately 20 ml of n-hexane and 330 ml of isopropanol with a rhodium content of 40 ml Rh/l and a triphenyl phosphine or triphenyl phosphine oxide content of 20 mg/l were mixed with 2.0 g of an organopolysiloxane from Example 3 consisting of units of the formula $S[(CH_2)_3SiO_{3/2}]_2$, with a particle size of <50 μm. The suspension was stirred for 1 hour under reflux. Subsequently, the solid substance was centrifuged away, was washed with 2×25 ml of isopropanol and was dried for 5 hours at 120° C.

The centrifuged substance and the washing liquid were combined for a total of 390 ml of solution. A determination of the rhodium content of this solution established a content of 0.8 mg Rh/l, that is to say, only 2% of the originally present rhodium quantity remained in the solution.

A measurement of the rhodium content of the dried solid substance resulted in a quantity of 13.5 mg, that is 96.4% of the total quantity present in the solution originally.

EXAMPLE 14

1200 ml of an aqueous solution of $RuCl_3$ with a ruthenium content of 25 ml Ru/l were mixed with 25 g of the organopolysiloxane produced according to Example 1 and consisting of polymer units of the formula $S[CH_2SiO_{3/2}]_2$. The suspension was stirred at 80° C. for 2 hours. After that, the solid substance was filtered off by means of a pressure filter and was washed with a total of 150 ml of water. A ruthenium analysis of the filtrate combined with the wash liquid (a total of 1320 ml) established a Ru content of 0.7 mg Ru/l, that is to say only 3% of the original quantity of ruthenium remained in the solution.

EXAMPLE 15

300 ml of a toluene solution of $IrCl_3(CH_2CN)_3$ complex with an iridium content of 10 ml Ir/l were stirred under reflux for 3 hours with 1.5 g of an organopolysiloxane according to Example 5, ground in a ball mill (for 1 hour) and consisting of units of the formula $S[(CH_2)_{12}SiO_{3/2}]_2 \cdot SiO_2$. After that, it was centrifuged off, the solid substance was washed two times, each time with 20 ml of toluene and was dried for 5 hours at 150° C./100 mbar.

Wash liquid and centrifugal product were combined and were concentrated to 100 ml. A determination of the iridium content of this solution resulted in a total quantity of 0.1 mg of Ir (about 3% of the originally present quantity). On the dried solid substance according to analysis, 2.8 ml of Ir (about 93% of the original quantity) were present.

EXAMPLE 16

300 ml of an alcoholic solution of $WOCl_4$, with a $WOCl_4$ content of 1.92 g/l and corresponding to a tungsten content of 1.03 g/l were mixed with 15 g of an organopolysiloxane according to Example 10, consisting of units of the formula

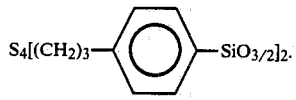

After 3 hours of stirring under reflux, it was filtered off. The residue was washed with 2×50 ml of ethanol. The total quantity of 20 mg of tungsten was found in the filtrate and wash liquid. This corresponds to 6.5% of the total quantity originally present in the solution.

EXAMPLE 17

After an analogous treatment as in Example 16, of 500 ml of an aqueous solution which had a content of 20 ml/l $Cr^{3+}$ with 8 g of the polymeric sulfide according to Example 6, only 5% of the originally present $Cr^{3+}$ quantity could be found in solution.

EXAMPLE 18

After analogous treatment as in Example 16, of 350 ml of a methanolic solution which had an $Mn^{2+}$ content of 300 mg/l with 6 g of polymeric tetrasulfide according to Example 4, ground finely for 2 hours in a ball mill according to Example 4, only 3% of the originally present $Mn^{2+}$ quantity could be found in solution.

EXAMPLE 19

After analogous treatment as in Example 16, of 50 ml of an aqueous/methanolic solution, which had an $Ni^{2+}$ content of 39 mg/l with 500 mg of polymeric cross-linked trisulfide according to Example 6 and ground for 1 hour in a ball mill, only 5% of the originally present $Ni^{2+}$ quantity could be found in solution.

EXAMPLE 20

After analogous treatment as in Example 16, of 10 ml of an aqueous/ethanolic solution which had a content of 2 ml/l complex bound Pd°, with 200 mg of the polymeric disulfide according to Example 2, only 20% of the originally present Pd° quantity could be found in solution.

EXAMPLE 21

After analogous treatment as in Example 16, of 100 ml of an aqueous solution which had a content of 27 mg/l of $Pt^{4+}$ with 4 g of the polymeric sulfide according to Example 1, only 5% of the originally present $Pt^{4+}$-quantity could be found in solution.

EXAMPLE 22

A column having an inside diameter of 2 cm which was filled with 20 g of the polymeric tetrasulfide according to Example 4, having a particle size of 0.2-0.6 mm was charged within 2 hours with 1 liter of an aqueous solution which had a concentration of 5.0 mg of $Cd^{2+}$/l. After the column had been washed again with ½ liter of desalinated water, the total quantity of the $Cd^{2+}$ still present was determined in the run combined with the wash liquid. According to this analysis, there was a total of only 0.2 mg (4%) of $Cd^{2+}$ present.

EXAMPLE 23

The column from Example 22 charged with a $Cd^{2+}$ solution was charged in an analogous manner with 1 liter of a solution which had a concentration of 1 mg of $Hg^{2+}$/l. After a further processing as in Example 22, no mercury in an analytically determinable quantity could be found in the run combined with the wash liquid.

EXAMPLE 24

A column with an inside diameter of 2 cm which was filled with 20 g of the polymeric trisulfide according to Example 6 having a particle size of 0.2–0.6 mm, was charged within 1.5 hours with 1 liter of an aqueous solution which had a concentration of 8 mg of $Ag^{+}/l$. After the column was washed again with ½ l of desalinated water, the total quantity of any remaining $Ag^+$ was determined in the run combined with the wash liquid. According to that measurement a total of only 0.3 mg of $Ag^+$ (approx 4%) was still present.

EXAMPLE 25

With the use of the column used in Example 24 and in analogous manner, the $Sn^{2+}$ content of 1 liter of an aqueous solution of 9 mg/l was reduced to a total of 0.2 mg of $Sn^{2+}$ (about 2%).

EXAMPLE 26

With the use of the column used in Example 23 and analogously to that Example, the $Pb^{2+}$ content of 1 liter of an aqueous solution was reduced from 3 mg/l to a total of 0.1 mg of $Pb^{2+}$ (about 3%).

Variations of the invention described herein will be apparent to those skilled in the art and are intended to be encompassed by the claims appended hereto.

I claim:

1. A solid polymeric mono-, di-, tri- or tetra-sulfide compound, which is insoluble in water and insoluble in organic solvents, having an organopolysiloxane base structure comprising units of the formula:

$$R^1-S_{2-4}-R^2 \qquad (1)$$

wherein $R^1$ and $R^2$ are the same or different and represent a group of the formula:

$$R^3-SiO_{3/2} \qquad (2)$$

wherein $R^3$ is a linear or branched alkylene with 1 to 12 C-atoms, cycloalkylene with 5 to 8 C-atoms,

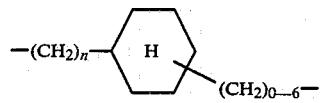

or

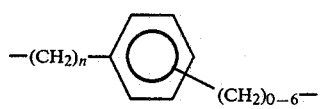

wherein n is an integer from 1 to 6 and represents the number of sulfur attached methylene groups, wherein the methylene group is directly bonded to the sulfur in formula (1);

the free valencies of the oxygen atoms are either saturated by silicon atoms of additional groups of the formula (2) and/or by cross-linking bridge members $SiO_{4/2}$ or $R'SiO_{3/2}$ or $R_2'SiO_{2/2}$ $TiO_{4/2}$ or $R'TiO_{3/2}$ or $R_2'TiO_{2/2}$ $AlO_{3/2}$ or $R'AlO_{2/2}$ wherein R' is methyl or ethyl and the ratio of the silicon atoms in formula (2) to the bridging atoms silicon, titanium and aluminum ranges from 1:0 to 1:10.

2. A polymeric mono-, di-, tri- and tetra-sulfide as claim 1, wherein the organopolysiloxane base structure contains titanium or aluminum heteroatoms.

3. A polymeric mono-, di-, tri- and tetra-sulfide as in claim 1, wherein $R^1$ and $R^2$ are identical.

4. A polymeric mono-, di-, tri- and tetra-sulfide as in claim 1, comprising units of a stoichiometric compound represented by the formula:

$S_{1-4}(CH_2CH_2CH_2SiO_{3/2})_2$

5. A polymeric mono-, di-, tri- and tetra-sulfide as in claim 1, wherein at least one of $R^1$ and $R^2$ is the group $R^3-SiO_{3/2}$ wherein $R^3$ is propylene.

6. A polymeric mono-, di-, tri- and tetra-sulfide as in claim 1, wherein $R^3$ is cycloalkylene with 5 to 8 C-atoms.

7. A polymeric mono-, di-, tri- and tetra-sulfide as in claim 1, wherein $R^3$ is

8. A polymeric mono-, di-, tri- and tetra-sulfide as in claim 1, wherein $R^3$ is

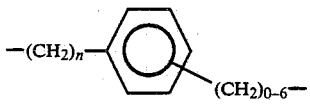

9. A polymeric di-, tri- and tetrasulfide as in claim 1 having the formula:

$R^1-S_{2-4}-R^2$

10. A polymeric tri- and tetrasulfide as in claim 1 having the formula:

$R^1-S_{2-4}-R^2$

11. A process for the production of a polymeric mono-, di-, tri- and tetra-sulfide comprising reacting a monomer compound of the formula:

$$R^4—S_{1-4}—R^5 \qquad (3)$$

wherein $R^4$ and $R^5$ may be the same or different and represent a group of the formula:

$$R^3—Si(OAlk)_3 \qquad (4)$$

wherein $R^3$ is a linear or branched alkylene with 1 to 12 C-atoms, cycloalkylene with 5 to 8 C-atoms,

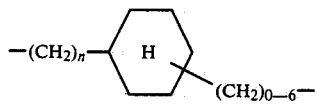

or

wherein n is an integer from 1 to 6 and represents the number of the sulfur attached methylene groups, Alk designates a linear or branched alkyl with 1 to 5 C-atoms, with at least the quantity of water required for a complete hydrolysis and condensation, and carrying out a hydrolysis and condensation reaction to thereby obtain a conversion reaction product.

12. The process according to claim 11, wherein an organic solution agent is present in the hydrolysis and condensation reaction.

13. The process according to claim 11, wherein a cross-linking agent of the general formula $$Me(OAlk)_{2-4}R'_{0-2} \qquad (5)$$

or $$Al(OAlk)_{2-3}R'_{0-1} \qquad (6)$$

wherein Me=Si or Ti,
Alk is a linear or branched alkyl with 1 to 5 C-atoms and R' represents a methyl or ethyl,
is present in the hydrolysis and condensation reaction.

14. The process according to claim 12, wherein an organic solution agent is also added.

15. The process of claim 11, wherein an amount in excess of the stoichiometric amount of water is added.

16. The process of claim 11, wherein a solid polymer reaction product is recovered.

17. The process of claim 11, wherein a suspension is formed of the polymer in water which is subjected to reflux temperature in order to obtain the product from the existing liquid phase.

18. The process of claim 16, wherein the product is dried.

19. The process of claim 18, wherein the dried product is tempered.

20. The process of claim 16, wherein the product is ground and/or classified.

21. A process according to claim 11, wherein the monomer compound according to the formula (3) is introduced into water with vigorous agitation.

22. The process of claim 11, wherein a solution of the monomer compound according to formula (3) is introduced into water with vigorous agitation.

23. The process of claim 22, wherein a cross-linking agent is also added which is of the formula $$Me(OAlk)_{2-4}R'_{0-2} \qquad (5)$$

or $$Al(OAlk)_{2-3}R'_{0-1} \qquad (6)$$

wherein Me=Si or Ti,
Alk is a linear or branched alkyl with 1 to 5 C-atoms and R' represents a methyl or ethyl.

24. The process of claim 21, wherein ambient temperature up to reflux temperature is used for complete hydrolysis and condensation.

25. The process of claim 22, wherein ambient temperature up to reflux temperature is used for complete hydrolysis and condensation.

26. The process as in claim 11, wherein the hydrolysis and the polycondensation of the monomer compound is carried out in the presence of a polar solvent.

27. The process of claim 26, wherein the solvent is methanol, ethanol, n-, or i- propanol, n-, i- or t-butanol or mixtures thereof.

28. The process as in claim 11, wherein the hydrolysis and polycondensation of the monomer compound is carried out at ambient temperature up to 200° C. at a normal pressure or at excess pressure which corresponds to the sum of the partial pressure of the components of the reaction mixture in the case of the reaction temperature used.

29. The process as in claim 11, wherein the product is recovered and dried in a vacuum.

30. The process as in claim 29, wherein room temperature up to 250° C. is used for drying of the product.

31. The process as in claim 11, wherein the product is dried, and tempered by heating with the use of a vacuum for at least one hour up to four days at 150°–400° C.

* * * * *